No. 740,767. Patented October 6, 1903.

UNITED STATES PATENT OFFICE.

AUGUST LEOPOLD LASKA, OF OFFENBACH-ON-THE-MAIN, GERMANY, ASSIGNOR TO THE FIRM OF K. OEHLER, ANILIN & ANILIN FARBENFABRIK, OF OFFENBACH-ON-THE-MAIN, GERMANY.

MORDANT DISAZO DYE AND PROCESS OF MAKING SAME.

SPECIFICATION forming part of Letters Patent No. 740,767, dated October 6, 1903.

Application filed March 31, 1903. Serial No. 150,381. (No specimens.)

*To all whom it may concern:*

Be it known that I, AUGUST LEOPOLD LASKA, doctor of philosophy, chemist, residing at 5 Gerberstrasse, Offenbach-on-the-Main, in the Grand Duchy of Hesse, have invented new and useful Improvements in Mordant Disazo Dyes, of which the following is a specification.

My invention relates to the manufacture of primary disazo dyes, which may be obtained by combining in an alkaline solution nitro derivatives of the orthodiazo-phenol with the monoazo dyes, resulting by the reaction of diazo compounds of the benzene series upon 2:5-amidonaphthol-7-sulfonic acid in an acid solution. The constitution of these coloring-matters is represented by the general formula

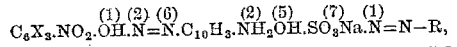

wherein "X" means H, CH$_3$, NO$_2$, Cl, SO$_3$H, COOH, and "R" a benzene residue.

Coloring-matters of this constitution have been unknown hitherto. I have found that these dyestuffs yield on wool when subsequently adding chromium mordants to the dye-bath very valuable shades from reddish black to bluish black and full black, distinguished by a prominent fastness against light, acids, alkalies, and milling.

In the following example I shall illustrate the nature of my invention and how it may be carried out and brought into practical effect, parts being by weight and degrees referring to the centigrade scale.

Suspend 54.5 parts of para-nitranilin-ortho-sulfonic acid in seventy-two parts of hydrochloric acid of 20° Baumé and five hundred parts of water. Then diazotize by means of 17.5 parts of sodium nitrite. Pour into this mixture a solution of 59.75 parts of 2:5-amidonaphthol-7-sulfonic acid and one thousand parts of water neutralized with soda, and for completing the reaction stir for twelve hours at 20°. Thus a monoazo dye results, which is combined in a strong alkaline and icy-cold solution with the diazo compound prepared as follows: 55.25 parts of the sodium salt of picramic acid are dissolved in one thousand two hundred parts of water, mixed with 17.5 parts of sodium nitrite and diazotized with one hundred and fourteen parts of hydrochloric acid of 20° Baumé at a temperature of about 0° to 5°. In order to complete the formation of the dyestuff, stir for about sixteen hours, heat up to 70°, salt, filter, press, and dry. The coloring-matter thus obtained forms a grayish-black powder which dissolves in water to a violet solution, which on addition of sodium lye changes to a bluish shade and to a claret-red on adding hydrochloric acid. It is soluble in concentrated sulfuric acid with a claret-red color and yields on wool when subsequently adding chromium mordants to the dye-bath bluish-black shades of a prominent fastness against light, acids, alkalies, and milling.

The above example is merely typical, and I do not confine myself to its directions, as they may be varied. Thus the para-nitranilin-o-sulfonic acid may be replaced by any diazo compound of the benzene series and the picramic acid may be replaced by all those nitro amido phenols which correspond to the general formula

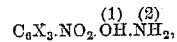

"X" meaning H, CH$_3$, Cl, SO$_3$H, COOH.

Now what I claim, and desire to secure by Letters Patent, is the following:

1. The process of making mordant dyes of the general formula

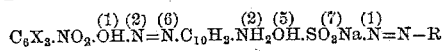

which consists in combining in an alkaline solution the diazo compounds of the amins of the general formula

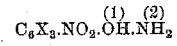

with the monoazo dyes, resulting by the reaction of diazo compounds of the benzene series upon 2:5-amidonaphthol-7-sulfonic acid in acid solution, whereby in the above formula "R" means a benzene residue, and "X" means H, CH$_3$, NO$_2$, Cl, SO$_3$H, COOH, substantially as described.

2. The process of making mordant coloring-matters of the general formula

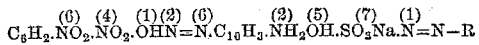

"R" meaning a benzene residue, which consists in combining in an alkaline solution diazotized picramic acid with the monoazo dyes, resulting by the reaction of diazo compounds of the benzene series upon 2:5-amidonaphthol-7-sulfonic acid in an acid solution, substantially as described.

3. The process of making a new mordant dyeing disazo coloring-matter which consists in combining in an alkaline solution diazotized picramic acid with the monoazo dye resulting by the reaction of diazotized para-nitranilin-ortho-sulfonic acid upon 2:5-amidonaphthol-7-sulfonic acid in acid solution, substantially as described.

4. As a new article of manufacture the new coloring-matter, which results from the reaction of diazotized picramic acid in an alkaline solution upon the monoazo dye obtained by combining in an acid solution diazotized para-nitranilin-ortho-sulfonic acid with 2:5-amidonaphthol-7-sulfonic acid, which forms a gray black powder, dissolves in concentrated sulfuric acid to a claret-red, in water to a violet solution changing to a bluer violet on adding sodium lye, turning to a claret-red on adding hydrochloric acid, and yields on wool when subsequently adding chromium mordants to the dye-bath, beautiful bluish-black shades of a prominent fastness against light, acids, alkalies and milling, substantially as herein described.

In testimony whereof I have signed my name to this specification in the presence of two subscribing witnesses.

AUGUST LEOPOLD LASKA.

Witnesses:
EVA SATTLER,
HERMAN WEIL.